(12) United States Patent
Hinterberger et al.

(10) Patent No.: US 11,621,567 B2
(45) Date of Patent: Apr. 4, 2023

(54) ELECTRIC ENERGY SUPPLY DEVICE COMPRISING A PLURALITY OF EXCHANGEABLE USAGE UNITS, AND METHOD FOR OPERATING SUCH AN ENERGY SUPPLY DEVICE

(71) Applicant: AUDI AG, Ingolstadt (DE)

(72) Inventors: Michael Hinterberger, Großmehring (DE); Berthold Hellenthal, Schwanstetten (DE); André Blum, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 308 days.

(21) Appl. No.: 16/625,235

(22) PCT Filed: May 18, 2018

(86) PCT No.: PCT/EP2018/063108
§ 371 (c)(1),
(2) Date: Dec. 20, 2019

(87) PCT Pub. No.: WO2018/233952
PCT Pub. Date: Dec. 27, 2018

(65) Prior Publication Data
US 2020/0144822 A1     May 7, 2020

(30) Foreign Application Priority Data
Jun. 23, 2017   (DE) ..................... 10 2017 210 610.7

(51) Int. Cl.
*H02J 3/38*     (2006.01)
*H02J 3/32*     (2006.01)
(Continued)

(52) U.S. Cl.
CPC .............. *H02J 3/466* (2020.01); *B60L 50/40* (2019.02); *B60L 50/66* (2019.02); *B60L 50/71* (2019.02);
(Continued)

(58) Field of Classification Search
CPC .... H02J 3/005; H02J 3/381; H02J 3/32; H02J 3/46; H02J 2300/24; H02J 2300/30;
(Continued)

(56) References Cited

U.S. PATENT DOCUMENTS 6,583,603 B1 *  6/2003  Baldwin .............. H02J 7/0048
                                                       320/121
7,087,327 B2    8/2006  Pearson
(Continued)

FOREIGN PATENT DOCUMENTS

DE           10010985 A1     9/2001
DE       102010049611 A1 *   6/2011  ............ B60L 3/0069
(Continued)

OTHER PUBLICATIONS

German Examination Report dated Mar. 23, 2018 in corresponding German Application No. 10 2017 210 610.7; 20 pages.
(Continued)

*Primary Examiner* — Elim Ortiz
(74) *Attorney, Agent, or Firm* — Maier & Maier, PLLC

(57) ABSTRACT

An electrical energy supply device having a plurality of usage units, each usage unit being adapted to generate or to buffer electrical energy. The usage units in the energy supply device are divided up into strands and each strand is adapted to generate a summed voltage by a series circuit of the usage units, and each strand end is connected across a respective switching unit to a busbar assembly and within each strand a bridging circuit is provided for each usage unit and a control device is adapted to identify a defective usage unit (Continued)

in one of the strands and to then galvanically separate the strand by its switching units from the busbar assembly.

15 Claims, 2 Drawing Sheets

(51) Int. Cl.
| | |
|---|---|
| *H02J 3/46* | (2006.01) |
| *B60L 50/40* | (2019.01) |
| *B60L 50/71* | (2019.01) |
| *B60L 53/22* | (2019.01) |
| *B60L 50/60* | (2019.01) |
| *B60L 50/75* | (2019.01) |
| *H02J 1/08* | (2006.01) |
| *H02J 7/00* | (2006.01) |

(52) U.S. Cl.
CPC ............... *B60L 50/75* (2019.02); *B60L 53/22* (2019.02); *H02J 1/08* (2013.01); *H02J 7/0031* (2013.01); *B60L 2210/30* (2013.01); *H02J 3/32* (2013.01); *H02J 3/322* (2020.01); *H02J 3/381* (2013.01); *H02J 2300/24* (2020.01); *H02J 2300/28* (2020.01); *H02J 2300/30* (2020.01)

(58) Field of Classification Search
CPC ...... H02J 3/322; H02M 1/32; H02M 7/53871; B60L 53/22; B60L 50/66; B60L 50/71; B60L 50/40; B60L 50/75; B60L 2210/30; B60L 50/72; B60L 53/60–68; B60L 55/00; B60L 53/50–56; B60L 53/66; B60L 53/65; B60L 53/63; B60L 53/62; B60L 53/57; B60L 53/31; B60L 53/11; B60L 53/10; B60L 50/15; B60L 50/70; B60L 50/60; B60L 50/61; B60L 53/30–39; B60L 53/14–18; B60L 53/67; B60L 53/665; B60L 53/16; B60L 53/53; B60L 53/54; B60L 53/55; B60L 53/68; Y02T 10/70; Y02T 10/7072; Y02T 90/12; Y02T 90/14; Y02T 90/16; Y04S 10/126; Y04S 40/12; Y02E 10/549; Y02E 10/70; Y02E 10/14; Y02B 90/20

USPC ........... 307/9.1, 10.1, 43, 44, 45, 46, 48, 66; 320/104, 101, 109, 111, 113, 114, 115, 320/119, 127, 128, 125, 137, 138
See application file for complete search history.

(56) References Cited

U.S. PATENT DOCUMENTS

| | | | |
|---|---|---|---|
| 8,330,301 B2 | 12/2012 | Demetriades et al. | |
| 10,283,974 B2* | 5/2019 | Macris | G01R 31/3842 |
| 10,295,608 B2* | 5/2019 | Rocci | H02J 7/005 |
| 2004/0009380 A1 | 1/2004 | Pearson | |
| 2006/0092583 A1 | 5/2006 | Alahmad et al. | |
| 2006/0172162 A1* | 8/2006 | Pearson | H01M 8/04947 |
| | | | 429/431 |
| 2009/0066291 A1 | 3/2009 | Tien et al. | |
| 2013/0057210 A1 | 3/2013 | Nergaard et al. | |
| 2017/0358934 A1* | 12/2017 | Miller | G01R 19/16542 |

FOREIGN PATENT DOCUMENTS

| | | |
|---|---|---|
| DE | 102010049611 A1 | 6/2011 |
| DE | 102011054145 A1 | 4/2012 |
| DE | 102011079874 A1 | 1/2013 |
| DE | 102013106265 A1 | 12/2014 |
| DE | 102015216097 A1 | 3/2017 |
| DE | 102016223470 A1 | 6/2017 |
| JP | H06-289189 A | 10/1994 |
| WO | 2013/021364 A1 | 2/2013 |
| WO | 2016/094939 A1 | 6/2016 |

OTHER PUBLICATIONS

International Search Report with English translation and Written Opinion with Machine translation dated Aug. 9, 2018 in corresponding International Application No. PCT/EP2018/063109; 20 pages.
International Search Report with English translation and Written Opinion with English translation dated Aug. 1, 2018 in corresponding International Application No. PCT/EP2018/063108; 23 pages.
International Preliminary Report on Patentability (Chapter I) dated Jan. 2, 2020, in corresponding International application No. PCT/EP2018/063108; 8 pages.

* cited by examiner

ELECTRIC ENERGY SUPPLY DEVICE COMPRISING A PLURALITY OF EXCHANGEABLE USAGE UNITS, AND METHOD FOR OPERATING SUCH AN ENERGY SUPPLY DEVICE

FIELD

The invention relates to an energy supply device having a plurality of usage units. The energy supply device may be, for example, a stationary battery accumulator or a vehicle battery for an electric vehicle. The usage units are then battery cell modules of the energy supply device. In general, each usage unit is adapted to generate or buffer electrical energy.

BACKGROUND

An energy supply device of the mentioned kind is known for example from U.S. Pat. No. 7,087,327 B2. This specifies that an energy supply device may comprise a series circuit of fuel cell stacks, which in total can provide an electrical voltage for an appliance connected to the energy supply device. Each fuel cell stack may be individually bridged electrically in the series circuit by a diode, so that in event of a defect the entire energy supply device is not blocked or shut down. There are replacement fuel cell stacks in the series circuit, so as to continue providing the voltage also when a fuel cell stack malfunctions. A replacement fuel cell stack remains unused until such time as it is needed on account of a defect in another fuel cell stack. If all replacement fuel cell stacks are in use, the entire energy supply device will be shut down upon a further defect of a fuel cell stack.

Another energy supply device with a plurality of usage units in the form of energy storage elements is known from US 2006/0092583 A1. The individual energy storage elements can likewise be combined by means of a plurality of switches into different circuitry configurations. A galvanic separation between the individual storage elements is not provided.

The problem which the invention proposes to solve is to make the electrical energy supply device able to operate once again with little down time upon a defect in a single usage unit or multiple usage units.

SUMMARY

The invention starts from the above described electrical energy supply device with the plurality of usage units. Each usage unit is adapted, in the described manner, to generate or buffer electrical energy. In the energy supply device according to the invention, these are arranged in a very particular manner. In the energy supply device, the usage units are divided up into strands and in each strand the usage units are hooked up in a series circuit. Each strand can generate by means of its series circuit of the usage units a summed voltage, which may lie in a range of 8 V to 60 or be greater than 60 V.

Each strand end is connected across a respective galvanically separable switching unit to a busbar assembly of the energy supply device. A switching unit may be formed, for example, on the basis of at least one mechanical switch, such as a contactor. Within each strand, a bridging circuit is provided for each usage unit. Thus, each usage unit can be bridged over individually in the series circuit, so that it no longer contributes to the summed voltage of the strand, and the current of the series circuit is also carried across the bridging circuit.

A control device of the energy supply device is adapted to identify a defective usage unit in one of the strands during the operation of the energy supply device. The identifying of a defective usage unit may be done by a method known in the prior art. For example, an electric voltage generated by one of the usage units can be compared to a threshold value, and if it falls below this the usage unit is considered to be defective. The control device may furthermore be adapted, if a defective usage unit is detected, to galvanically separate the strand by means of its galvanically separating switching units from the busbar assembly. But now the series circuit of the strand is still under the summed voltage. Therefore, the control device is further adapted to clear the summed voltage of the strand by electrical separation of the usage units of the strand by means of their bridging circuits, so that in place of the summed voltage only the individual voltages of the usage units are still present.

Hence, there are now only present in the strand its usage units with the individual voltage, which may lie in a range of 1 Volt to 25 Volt. In order to replace and/or repair a usage unit, the entire energy supply device therefore does not need to be disconnected. A replacement of a usage unit can be done during ongoing operation. For this, the affected strand may be galvanically separated from the busbar assembly (my means of the mechanical switching units) and then the strand is switched free of the summed voltage by separating the usage units from each other (by means of their bridging circuits). The maximum electrical voltage occurring in the decoupled strand then corresponds to the individual voltage of each energy supply unit. In particular, this voltage is not dangerous, because it is less than a summed voltage. The defective usage unit can then be disassembled or taken out from the strand, while at least one further strand continues to generate electrical summed voltage in the busbar assembly and thus the operation of the energy supply device can continue without interruption. The replacement during operation is also known as the Hot-Plugging or Hot-Swapping principle (https://de.wikipedia.org/wiki/Hot_Swapping). It prevents a total shutdown of the energy supply device upon failure of a single component. Thanks to the galvanic separability, the defective component can be isolated.

The invention also includes advantageous modifications whose features afford additional benefits.

The design of the energy supply device is very flexible. Each usage unit may comprise at least one battery cell, especially a battery cell module or an assembly of multiple battery cell modules (hooked up in parallel for example). The usage units may each comprise at least one fuel cell and/or at least one solar panel and/or at least one capacitor and/or an electrical generator. Preferably, the technology of the usage units hooked up in series in each strand is the same, i.e., for example, it is formed only by battery cell modules.

In order to galvanically separate a strand end from the busbar assembly, each switching unit may comprise at least a contactor of ON/OFF type or a contactor of changeover switch type. Each switching unit can bring about a galvanic separation between busbars of the busbar assembly on the one hand and a strand end of a strand on the other hand. If multiple busbars are provided for each strand end, a switching between the busbars can be done by means of multiple contactors of ON/OFF type or by a contactor of changeover switch type (1-to-N multiplexer), so that the summed voltage of the strand drops alternately across different busbars.

Now, once the galvanic separation of a strand and the clearing of the summed voltage has taken place, the usage unit can be removed and a new usage unit can be installed. For this modification, the control device is adapted, after exchanging the defective usage unit for a new usage unit during the operation of the energy storage device, to couple the new usage unit electrically to the other usage units of the strand. For this, the new usage unit can be hooked up once again in series with the other usage units by means of its bridging circuit, so that its individual voltage contributes to the summed voltage. Hence, a defective usage unit can be replaced by a new usage unit without interrupting the energy supply or an energy exchange of the energy supply device with a connected appliance.

In order to detect a defective usage unit, one modification proposes that a respective diagnostic unit is provided in the strands for each usage unit for detecting a current state value of a predetermined electrical parameter of the respective usage unit. One example of such a parameter is the impedance of a usage unit. The control device of the energy supply device is adapted to receive via a communication device of the energy supply device the state values of all the usage units of the respective strand and to identify the defective usage unit with the aid of its state value. A suitable communication device may be a data network or a data bus. One example of a data bus is a CAN (CAN=Controller Area Network) bus. In the case of impedance, a usage unit can then be regarded as defective if its state value or its impedance is greater than a threshold value. By the term "impedance" is meant in the context of the invention an impedance value at a predetermined frequency, such as 0 Hz, or an impedance variation as a function of the frequency f. Multiple frequencies can be checked in a frequency sweep with a stepwise incrementing or decrementing. Alternatively, a multifrequency excitation can be provided at the same time in the case of multiple frequencies. The multifrequency excitation may be designed, e.g., as a multi sine excitation or as a square wave or as a step signal An energy supply device may also comprise an input terminal for connection of an electrical supply grid (such as a 50 Hertz/3 phase supply grid) or another alternating current source. In this modification, the energy supply device comprises an AC/DC converter assembly connected to the busbar assembly for the exchanging of electrical energy with the public electrical supply grid or with an alternating current source. Here as well, the operation of the energy supply device should continue in event of an outage. For this, the AC/DC converter assembly comprises multiple AC/DC converters, each of which is coupled by its own decoupling switch to the grid terminal or an input terminal for the supply grid on the one hand and to the busbar assembly on the other hand. Now, if one AC/DC converter goes down because it is defective, the busbar assembly can continue to be supplied with electrical energy from the supply grid or the alternating current source by means of another AC/DC converter. For this, the control device is adapted to detect, during the operation of the energy supply device (i.e., without an interruption in operation), a defective AC/DC converter and to decouple it galvanically by operating its decoupling switch. A diagnostic unit for detecting a defective AC/DC converter may be found in the prior art. Thus, there is a self-monitoring of the AC/DC converter, such as is known in itself. Now, once the defective AC/DC converter has been galvanically decoupled by operating its decoupling switch, it can also be replaced. In this way, such a defective AC/DC converter can be galvanically decoupled and replaced during the operation of the energy supply device without having to disconnect the rest of the energy supply device.

As already mentioned, the busbar assembly may comprise multiple busbars. By this is meant that multiple busbars are present for each polarity (plus and minus). The mentioned switching units at the strand ends of each strand are adapted in this modification to switch between the busbars in dependence on a switching signal of the control device. In this way, a strand may be used for the supplying of different appliances, which may each be connected to different busbar pairs. A galvanic separation between the circuits is then also present, being formed by the different appliances, the busbars, and the respective strand. Thus, the galvanic separability affords the benefit that independent, i.e., galvanically separate current pathways can be provided, thus making possible a charging and a discharging of different strands at the same time.

In order to adjust or regulate a current flowing from a strand in the busbar assembly with regard to the current strength, it is preferably provided that the series circuit of the usage units in the strands is coupled each time across a DC voltage converter to one of the strand ends. In general, the DC voltage converter may be a boost converter or a buck converter or a buck-boost converter. Preferably a buck converter is used as the DC voltage converter.

The method according to the invention results from the operation of the energy supply device according to the invention. The method starts from the energy supply device having the plurality of usage units, which are each adapted to generate or to buffer electrical energy. Each usage unit generates a DC voltage. The usage units in the energy supply device are divided up into strands and in each strand its usage units are connected to form a series circuit, and each strand is adapted to generate a summed voltage by means of its series circuit of the usage units.

Each strand end is connected across a respective galvanically separable switching unit to a busbar assembly of the energy supply device and within each strand a bridging circuit is provided for each usage unit. The control device identifies a defective usage unit in one of the strands during the operation of the energy supply device and if a defective usage unit is detected it then galvanically separates the strand by means of the switching units of the strand from the busbar assembly. It then clears the summed voltage of the strand by means of the bridging circuits by electrical separation of the usage units of the strand. In this way, in place of the summed voltage only the individual voltages of the usage units are still present in the stand. Hence, the described replacement of the defective usage unit is possible in a state free of the summed voltage.

The invention also includes modifications of the method according to the invention having features such as are already specified in connection with the modifications of the energy supply device according to the invention. For this reason, the corresponding modifications of the method according to the invention are not again described here.

In the following, exemplary embodiments of the invention shall be described. For this, there are shown:

DETAILED DESCRIPTION

The exemplary embodiments explained in the following involve preferred embodiments of the invention. In the exemplary embodiments, the components of the embodiments which are described constitute individual features of the invention, to be viewed independently of each other, which also modify the invention independently of each other and thus are also to be regarded as part of the invention individually or in a different combination than the one shown. Furthermore, the embodiments described may also be amplified by other features of the invention which have already been described.

In the figures, functionally identical elements are each time given the same reference numbers.

Figure 1:
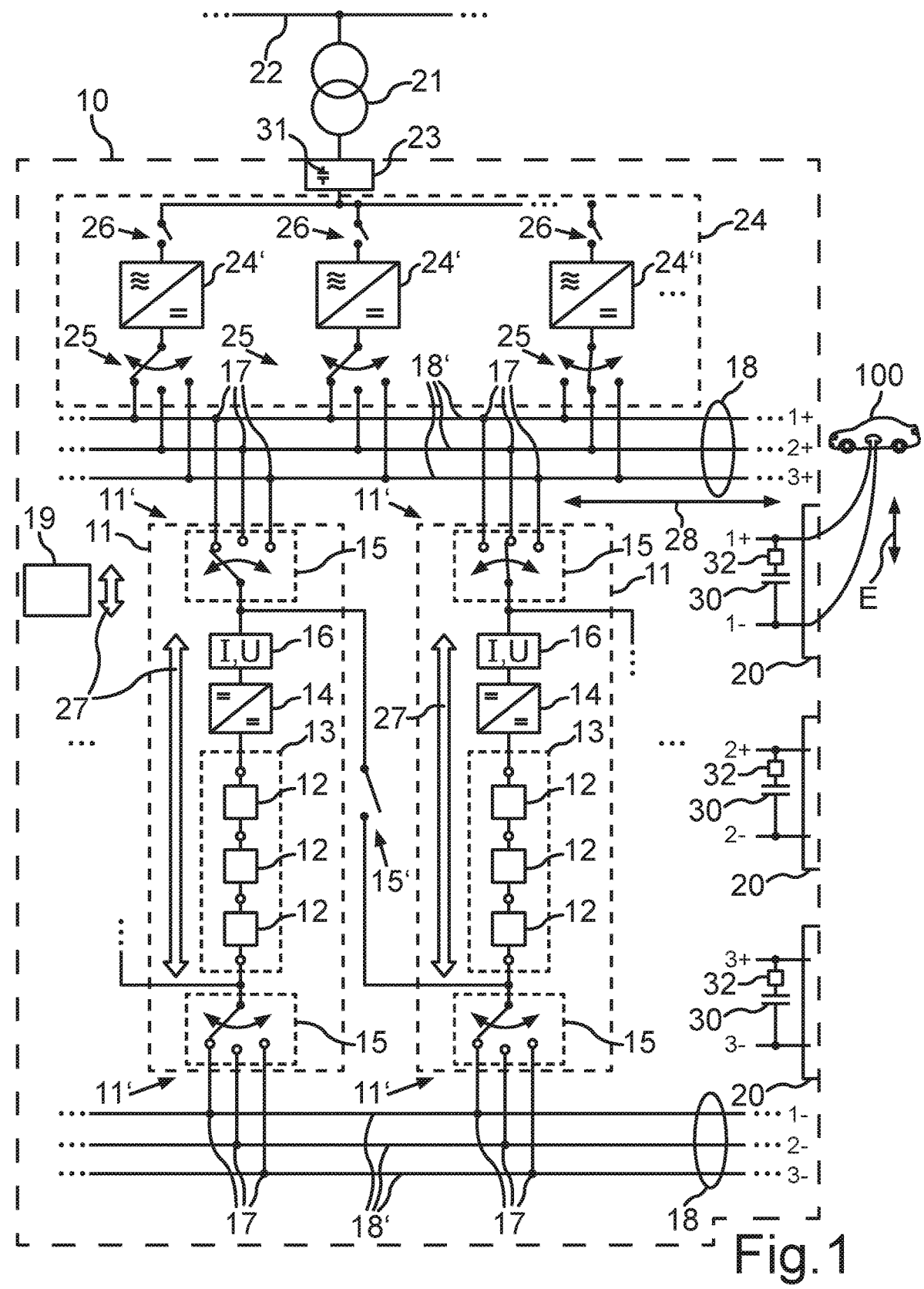
FIG. 1 a schematic representation of one embodiment of the energy supply device according to the invention.

FIG. 1 shows an electrical energy supply device 10, which may be designed as an energy storage or as a pure energy source or as a combination thereof. The energy supply device 10 may, e.g., be provided as a stationary storage for electrical energy. It may be constructed, e.g., on a road network. At least one appliance 100, such as an electrically powered motor vehicle, may then be connected to the energy supply device 10, in order to charge, e.g., a traction battery of the motor vehicle by means of an energy exchange E. The energy supply device 10 may also be provided for use as a mobile battery or a traction battery or a solar storage. As the traction battery, for example an electrical machine of a traction drive can be connected to the energy supply device. The energy supply device 10 in the charged state can put out at least 1 kW of electrical power and/or deliver at least 1 kWh of electrical energy.

In the energy supply device 10, multiple circuit pathways or strings or strands 11 may be provided for the energy exchange E, and in each strand 11 multiple usage units 12 may be hooked up to form a series circuit 13. The usage units 12 are thus brought together in the energy supply device 10, i.e., in a vehicle traction battery or in a stationary electrical storage, for example. The energy supply device 10 may comprise a housing in which the strands 11 and the busbar assembly 18 are arranged.

Each usage unit 12 may contain respectively an electrical energy storage and/or a pure source for electrical energy. As the energy storage, a usage unit may contain, e.g., an electrochemical battery cell or a battery cell module with multiple battery cells or a capacitor or a capacitor assembly having multiple capacitors. Examples of battery cells are those with lithium ion, lead, and solid state technology. Examples of suitable capacitors are dual-layer capacitors (so-called supercaps (R)) with a capacity of preferably at least 1 mF, especially at least 100 mF). Examples of a pure source are a fuel cell and a solar cell. As the energy source, a usage unit 12 may contain, e.g., a fuel cell or a fuel cell stack or a solar cell or a solar panel or a generator, e.g., of a power station (such as a pumped storage power station). A usage unit 12 may also comprise a parallel circuit of multiple battery cells or battery cell modules, for example, in order to boost the current.

Within each strand 11, the technology used for the usage units 12 is the same, i.e., for example, only battery modules or only solar cells are provided. Thus, each strand 11 comprises usage units 12 of the same technology, for example, each one has a lithium ion accumulator as the battery cell module. But mixed technologies may also be provided by different strands 11. In this way, the energy supply device may be adapted to a purpose of use or to a required operating profile. For example, two strands of different technology may be provided for the use of the energy supply device 10 in the motor vehicle as a traction battery, e.g., with a dividing up of the number of usage units 12: 80% energy cells (large storage capacity), 20% power cells (more costly, but greater power flow).

Each strand 11 may further have, as shown in FIG. 1, in addition to the series circuit 13 of usage units 12: a DC voltage converter 14, a respective mechanical switching unit 15 at the strand ends 11', a measuring device 16 for a strand current strength I and/or a voltage measuring device to detect a summed voltage or a strand voltage U of the strand 11.

Each DC voltage converter 14 may be designed in known manner. In general, the DC voltage converter may be a boost converter or a buck converter or a buck-boost converter. In particular, each DC voltage converter 14 may be a buck converter. Each switching unit 15 may have a mechanically switching design and in particular be capable of galvanic separation. Each switching unit 15 may have multiple ON/OFF contactors or (as shown in FIG. 1) a contactor designed as a changeover switch (1-to-N multiplexer). By means of each switching unit 15, the respective strand end 11' can be alternately connected to and separated galvanically from strand terminals 17. Each strand terminal 17 constitutes an electrical connection to a busbar 18'. The busbars 18' as a whole form a busbar assembly 18 of independent busbars 18'. Each strand terminal 17 of a strand 11 may be connected to another busbar 18' of the busbar assembly 18. Thus, multiple strand terminals 17 may be provided for each strand end 11' (plus pole and minus pole), in order to alternately connect the strand 11 to multiple different busbars 18' of the busbar assembly 18 or separate it from each busbar 18' galvanically. Thus, by opening the two switching units 15 of a strand 11, the strand can be galvanically decoupled and also be replaced during the ongoing operation of the energy supply device 10.

Each strand 11 can provide by means of the series circuit 13 a summed voltage or DC voltage U at the strand terminals 17. The DC voltage U may be a DC voltage (HV) which can amount to more than 60 V, especially more than 100 V. But it may also be provided that the DC voltage U lies in the range of 8 V to 60 V. Thus, between two busbars 18' there is present a DC voltage if a strand 11 is galvanically connected to them. For this, each strand 11 may be galvanically connected alternately by means of its switching units 15 to a respective pair of busbars 18. The strand 11 may be alternately switched galvanically by means of the switching units 15 to a respective busbar pair by connecting each time a stand end 11' to a busbar 18' of the busbar pair, so that the DC voltage U drops across the busbar pair.

The measuring unit 16 may also provide the mentioned total voltage measurement across the string 11, in order to detect the DC voltage U. For this, the measuring unit 16 is preferably connected downstream from the DC voltage converter 14, as shown in FIG. 1, in order to make possible a voltage regulation by means of the DC voltage converter 14. As shall be further explained in connection with FIG. 2, an individual voltage measurement is also provided in each usage unit 12.

The at least one appliance 100 can be connected across the busbar assembly 18 to the strands 11. Thus, a busbar matrix is formed by the busbars 18' of the busbar assembly 18, by which optionally at least one selected strand 11 can be electrically connected to a selected appliance 100, while at the same time another appliance can be electrically connected to at least one other strand 11. The appliances remain galvanically separated from each other in this case. Which strand 11 is electrically connected to which busbar 18' can be determined by a control device 19. For this, the control device 19 can ascertain a respective energy demand and/or a respective power demand of the at least one connected appliance 100 and then select at least one strand 11 by means of which the demand can be met. The demand can be communicated by the appliance 100 itself, e.g., via a communication interface, or it may be stored e.g. as a fixed value in the control device 19. The control device 19 can then connect the switching units 15 of each selected strand 11 to the busbars 18' leading to the connected appliance 100.

Each time a further switching unit 15' can be provided between every two strands 11 in order to hook up two strands 11 in series and thus add their strand voltages together. In this way, a larger voltage can also be provided between two busbars 18' than can be generated by a single strand 11.

The busbars 18' can be respectively connected in pairs to an output terminal 20, to which a respective appliance 100 can be connected. The connections of the busbars 18' to the individual electrical contacts of the output terminals 20 are indicated in FIG. 1 by corresponding lettering 1+, 2+, 3+, 1−, 2−, 3−, where "+" can stand for plus potential and "−" for minus potential or ground potential. The lettering symbolizes three possible busbar pairs: 1+, 1− and 2+, 2− and 3+, 3−, while another switching device, not shown, can also connect the electrical contacts of the output terminals 20 alternately to different busbars 18'. The output terminals 20 in this process can constantly remain galvanically separated from each other, as long as each busbar 18' of a terminal 20 is galvanically connected to another strand 11.

A simultaneous charging and discharging of different strands 11 may also be provided here, e.g., in order to supply an appliance 100 successively with electrical energy from different strands 11, which are recharged in the meantime. For example, a charging process of an electric vehicle (or an appliance in general) can occur across a busbar pair with an output voltage of 400 V, while at the same time a charging of other strands 11 may occur, e.g., via a transformer 21 with a charging voltage of 800 V, from a supply grid 22 or from another energy source external to the device. The transformer 21 can be connected to an input terminal 23 of the energy supply device 10. If the strands 11 are not designed for this charging voltage, they can be hooked up in series by means of the switching unit 15' to form a series circuit. The galvanic separation occurs through the use of different busbars 18' for the respective strands 11 and/or each voltage level (output voltage and charging voltage, e.g., 400 V and 800 V).

The strands 11 can also bring about a power concentration, in that an energy source, such as a solar layout, with a first power feeds energy to at least one strand 11 at the input terminal 23 and then the strand 11 surrenders this energy once more with a second power, which is greater than the first power, to an appliance 100 connected to an output terminal 20.

As a stationary storage, the energy supply device 10 may optionally comprise a modular-design AC/DC converter assembly 24 for the input terminal 23, having multiple AC/DC converters 24', which can be individually switched between the busbars 18' by means of a switching unit 25 in order to provide a predetermined current strength and/or charging voltage for a charging current on a busbar 18' or also to galvanically separate the respective AC/DC converters 24' from the busbar assembly 18. A galvanic separation from the input terminal 23 is also possible by means of further switching units 26. The switching units 25, 26 may be formed each time by a contactor. The switching units 25, 26 can be controlled by the switching device 19. Thus, by opening the two switching units 25, 26 of an AC/DC converter 24', this converter can be galvanically decoupled and also replaced during the ongoing operation of the energy supply device 10. The switching units 25, 26 thus constitute decoupling switches. The AC/DC converters 24' may be galvanically separating types. But the AC/DC converter assembly 24 need not have galvanically separating AC/DC converters 24'. Other converters are more favorable. The galvanic separation can be provided at any time by means of the mechanical switches of the strands.

A grid-autonomous energy source, such as an emergency generator or a wind turbine, may be connected to the input terminal 23 in place of the supply grid 22. On the other hand, the energy supply device 10 itself may provide a grid, i.e., it may dictate a grid frequency for other appliances connected to the input terminal. This is especially advantageous for the use of the energy supply device 10 in a region without its own supply grid 22. It is possible to operate AC appliances without adaptation, as in a public supply grid. The reverse of a grid-forming operation is a grid-following operation, i.e., an operation synchronized to a given grid frequency.

For the switching of the switching units 15, 15', 25, 26 and the usage units 12 and for the receiving of data from the usage units 12, the control device 19 may be coupled to these components via a communication device 27. The communication device 27 may comprise, e.g., a communication bus, such as a CAN (CAN—Controller Area Network) bus, or an Ethernet.

The control device 19 thus accumulates general knowledge as to what can be switched in which manner, i.e., which busbar 18' can be hooked up to which strand 11. The control device 19 may be designed at least partly as a central control device for all strands 11 and/or at least partly as a distributed control device for each strand 11. It may comprise a processor device with at least one microcontroller and/or at least one microprocessor. An operating program of the processor device may be adapted to carry out the described method steps for the operation of the energy supply device 10 when executed by the processor device.

Optionally, capacitors 30, 31 (especially dual-layer capacitors) may be provided at the output terminals 20 and/or at the input terminal 23 in order to buffer load peaks. In this way, when load peaks occur (in the range of up to 3 s or 5 s, for example), the usage units 12 can be operated more gently, since the load peak is damped. A load peak may be an electrical power greater than the sum of the individual power ratings of the connected usage units 12, especially a power greater than 1.2 times the sum.

For a changeover operation at the busbars 18', a recharging circuit or limiting circuit 32 (switch and resistor element) may be hooked up in series with the respective capacitor 30, 31 in order to conduct a capacitor current through the resistor element, thereby limiting the current strength of the capacitor current to a predetermined maximum value. The limiting circuit 32 can be used for the charging and discharging of the respective capacitor 30, 31. A capacitor 30, 31 with its limiting circuit 32 constitutes a capacitor device. The limiting circuit 32 thus constitutes a precharge circuit.

A cooling of the strands 11 (especially the usage units 12 in the strands 11) for example in a rack can be provided by arranging a cooling level beneath the strand level.

Each busbar 18' may be made of aluminum or copper. Aluminum is a more economical material and is lighter than copper. Aluminum due to its resistivity generates a loss power (and moreso than copper), from which heating power can be generated for a temperature control of the usage units 12 (especially battery cells), which can be transferred by a thermal coupling, e.g., a cooling circuit, from the busbars 18' to the usage units 12.

When the current is divided up among multiple strands 11 on one busbar 18', the current strength I can be adapted, e.g., equalized or dynamically adjusted, by setting or regulating the individual strand currents I via the DC voltage converter 14 of the strand 11. Thus, for example, the required total current strength for the appliance 100 can be apportioned among N strands 11, e.g., N=3, and each strand 11 can generate its own current strength I setting, e.g., with N=3: 50%, 25%, 25%.

In this way, the available technology of the usage units 12 in the respective strand 11 can be taken into account, so that the usage units 12 are operated within their specification. Since the electrical voltages U can be determined, the DC voltage converter 14 can then be used to set the current I, so that equalization currents will flow between the strands 11, for example, which are smaller than a threshold value. Thus, e.g., it can be assured that, in the case of batteries, a current I of up to 300-400 A per battery cell will flow for only 15 s, but a continuous current will flow only up to 150 A. Thus, each strand 11 may be operated with its own operating strategy, adapted to its technology. A suitable current strength I can be set by means of the DC voltage converter 14.

In addition or alternatively, in dependence on the line length 28 of the busbar sections leading from a strand 11 to an output terminal 20 (i.e., to a consumer), the current strength I of the respective strand 11 can be adjusted by means of its DC voltage converter 14 through the control device 19 in order to set the apportionment of the current strengths I in the case of multiple parallel-switched strands 11 in dependence on the line length 28 and in dependence on the consequently resulting losses, in order to optimize the losses (e g , minimize them, or maximize them for heating) and/or to apportion them physically. A strand 11 with shorter line length 28 of the feed line across the busbars 18' can be allocated a greater current strength I for the minimization than a strand 11 with longer line length 28. Hence, the effect of different line lengths is compensated. The current strength I may also be set in dependence on a current temperature of the line sections. Thanks to such a power management, the drawback of the higher resistivity of aluminum can be compensated by dictating and adapting the current strength to individual line sections.

Thus, summarizing, when so needed the control device 19 can hook up the strands 11 with the currently required aptitude to the particular busbars 18 leading to the output terminal 20 at which the power will be picked off by a connected appliance 100. Each strand 11 can be decoupled as needed by means of its switching units 15. Each strand 11 may be individually drained or loaded. In addition or alternatively, an efficiency optimization for the DC voltage converter 14 within the strand 11 can be carried out by setting its input voltage through the selecting and hooking up of usage units 12. The DC voltage converter 14 of each strand 11 can thus perform two duties. It limits the strand current I to a predetermined target value so that usage units 12 can be operated according to their predetermined specification (operating limits). The voltage U of the strand 11 can be equalized to the busbar voltage. In this way, the equalizing currents between multiple strands 11 can be reduced. In addition, the DC voltage converter 14 ensures that a predetermined nominal voltage is present at the strand terminals 17, regardless of the number of usage units 12 actively being operated in the strand 11.

A current metering 16 for the strand current I can be done centrally in the described manner in the measuring unit 16 in the strand 11 and this is necessary any way for the regulating of the DC voltage converter 14.

The central control device may also reconfigure the strand individually within each strand 11, i.e., turn usage units 12 on and off in the series circuit 13 of the strand 11. For example, if the strand voltage U is less than a required busbar voltage of the connected busbars 18', more usage units 12 can be switched on in the series circuit 13 of the strand 11. This may be done by means of semiconductor switches (e.g., transistors) so quickly that it may occur during a switch pause of the DC voltage converter 14.

Figure 2:
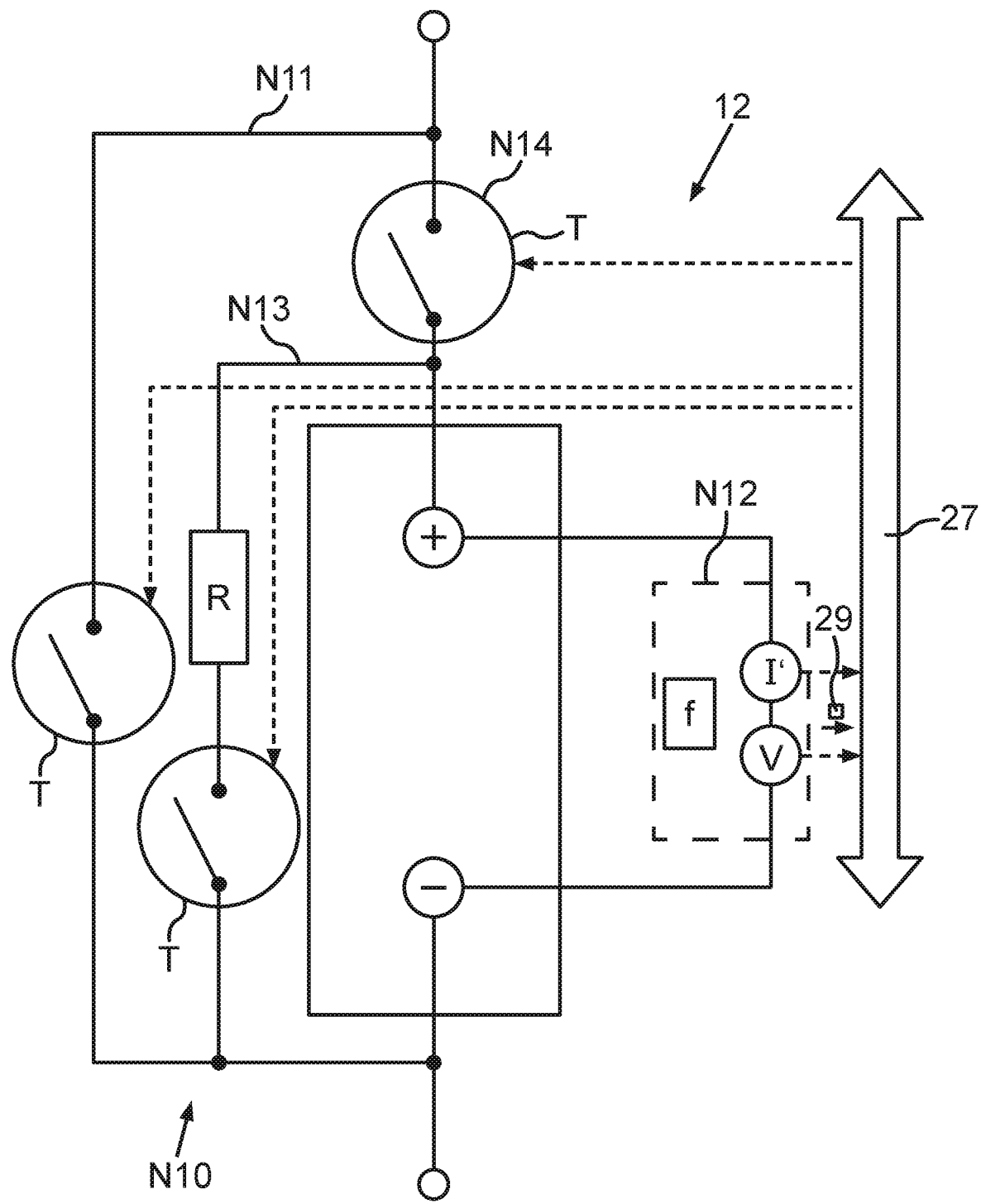
FIG. 2 a schematic representation of a usage unit of the energy supply device of FIG. 1 with a bridging circuit.

For this, FIG. 2 shows how each usage unit 12 can be electrically bridged over, electrically isolated, and/or discharged by an individual switching device N10. For this, semiconductor switches T (transistors) are provided as mentioned. Each usage unit 12 may provide as functions: a bridging/a bridging circuit N11, a diagnostic unit N12, a (especially passive) load balancing/a discharging circuit N13, a decoupling/separation circuit N14. A semiconductor switch T need only be able to block a low voltage, e.g., 2x the individual voltage V of the usage unit 12. The load balancing may also be done actively in known manner (so-called active load balancing). In addition to the switch for the separation circuit N14, another switch may also be provided for the second, opposite pole (all-pole switching).

The diagnostic unit N12 may be adapted in known manner for a cell analysis, e.g., an impedance metering by means of impedance spectroscopy, for example. For this, the diagnostic unit N12 can determine for each usage unit 12 for the impedance spectral analysis (0 Hz to 3 kHz, for example) a measurement current I' and an individual voltage V in the case of multiple frequencies f, resulting in the impedance as a function of the frequency f. This represents an impedance spectrum. The diagnostic unit N12 may report a current state value 29 of a measurement current I' and/or the individual voltage V and/or the measured impedance via the communication device 27 to the control device 19. By the term "impedance" is meant in the context of the invention an impedance value at a predetermined frequency, such as 0 Hz, or an impedance variation as a function of the frequency f. Multiple frequencies can be checked in a frequency sweep with a stepwise incrementing or decrementing. Alternatively, a multifrequency excitation can be provided at the same time in the case of multiple frequencies. The multifrequency excitation may be designed, e.g., as a multi sine excitation or as a square wave or as a step signal.

Each usage unit 12 can thus be individually monitored, for example in regard to its SoH (State of Health—state of wear) and/or SoC (State of Charge—energy supply capacity) and/or SoF (State of Function—performance capability). The parameters SoH and SoC and SoF are known in the prior art.

Independently of the impedance measurement, the individual voltage V of the usage unit 12 can also be measured without the alternating voltage of the impedance measurement. A usage unit 12 which is bridged over (by means of the bridging circuit N11) can also be monitored in regard to its individual voltage V. Before being turned on (N14 making the circuit or making electrically conductive), the individual voltage V of the usage unit 12 can be individually adapted by means of the load balancing N13. Optionally, an electrical charging unit may also be provided for each usage unit 12, which can individually charge the usage unit 12 even when the semiconductor switch of the separation circuit N14 is open (each usage unit 12 may thus be charged individually). The energy supply for the charging unit may come, e.g., via the communication device 27 (e.g., by means of Power-over-Ethernet technology) or by means of a galvanically separated power supply unit.

An interlocking of N11 and N14 can be provided (e.g., by software or by logic circuit), so that no short circuiting is produced.

In addition, a temperature measurement by the diagnostic unit N12 or by the control device 19 can provide feedback as to the temperature from the impedance.

Hence, the control device 19 has access to each individual usage unit 12 via the communication device 27. The state of each usage unit 12 can be read out and the switching device N10 of each usage unit 12 can be controlled, in particular the bridging circuit N11 in combination with the separation circuit N14. By combined switching of the bridging circuit N11 and the separation circuit N14, a usage unit 12 in the series circuit can be alternately switched on and off.

On this basis, the wear/condition of each usage unit 12 can be determined centrally in the control device 19 (e.g., in the form of the impedance as a wear value) and the switching state of each usage unit 12 can be adjusted in dependence on the condition so determined. Individual usage units 12 can be electrically removed from the string 11 (bridging N11), inserted (hooked up in series), individually discharged (discharging resistor R, balancing circuit N13), or temporarily electrically separated (N14 opening the circuit/electrically blocking), e.g., for the diagnostic unit N12.

Hence, it is possible to respond to different wear/individual parameter variance of the usage units 12 in the strand 11: preferably only usage units 12 with similar parameter values will be operated actively. The similarity can be defined by a similarity criterion, which indicates e.g. a maximum difference of at least one parameter, the difference lying in the range of 10% to 100% (twice/half). An old/weak usage unit 12 will at first be bridged or disconnected. This can be recognized by a performance capability criterion, which is related to the impedance, for example, or defined in that the similarity criterion is violated. The performance capability criterion thus excludes usage units 12 which are too weak. The switching in of old usage units 12 or weak usage units 12 becomes possible afterwards once the strand conditions are suitable, that is, the other usage units 12 are likewise worn down so much that the similarity criterion is once more fulfilled.

Thanks to the similarity criterion, the need for a load balancing can be reduced. The power per usage unit (current I in the strand is the same, but a different power results for different voltage, resulting in a local heating and thus aging or wear) can be equalized in advance. This is because load balancing requires an equalizing to the "weakest" usage unit, i.e., the one which is generating the lowest voltage, i.e., it must be reduced to the lowest voltage. Thanks to creating identical or similar operating conditions in advance by means of the similarity criterion, less balancing is needed. Thus, for example, if the individual voltages of V=4.1 Volt and V=3.9 Volt are present in a strand, a balancing would have to adjust to the weakest usage unit, i.e., to 3.9 Volt. With the internal resistance measurement (impedance spectroscopy), the weakest usage unit (greatest internal resistance) can be identified (performance capability criterion) and disconnected from the strand 11 (bridging N11). But the impedance is only one example of the identifying of a weak usage unit. In general, the identifying of the weakest usage unit can be done in dependence on a state of the usage unit.

By electrical decoupling/separating N14 of all usage units 12 of a strand 11, the strand 11 can also be switched HV-free. All usage units 12 are decoupled from each other. In this safeguarding mode, the strand 11 can be secured, e.g., for an installing, an accident protection, an emergency, or a transport. The switching sequence is important. First the mechanical switching units 15 (contactors) are opened, then the usage units 12 are decoupled N14 in series.

The control device 19 can also provide a wear equalizing or wear leveling of the individual usage units 12. Wear leveling provides a homogeneous usage of the field or arrangement of usage units 12. In this way, wear is equalized during the operation of the usage units 12. An example is the wear leveling from flash memory technology (https://en.wikipedia.org/wiki/Wear_leveling).

The benefit from equalizing the wear is a lengthening of the overall lifetime of the energy supply device 10, since it reduces the probability of malfunction of individual usage units 12, such as may be caused by excessive wearing of an individual usage unit 12.

The supplying/removal of energy, i.e., the energy exchange E with a connected appliance 100, occurs by means of the nearest usage units 12 according to wear leveling. For this, a current wear state is indicated for each usage unit 12 as a wear value. The purpose of this procedure is thus a uniform wear. The wear value may be represented, e.g., by the impedance of the usage unit 12. The wear value indicates a deterioration of the usage unit 12.

For each usage unit 12, depending on the wear value, it is possible to determine a respective target value of at least one operating quantity, such as the current I during the discharging and/or the individual voltage V during the charging, on the basis of an equalization criterion, where the equalization criterion ensures that, by adjusting each target value, one or more or all of the usage units 12 will perform the energy exchange E completely, yet the difference in deterioration of the usage units 12 as calculated from all wear values is kept to a minimum. Thus, the deterioration of the usage units 12 is equalized during the energy exchange E in that more heavily worn down usage units 12 are loaded less than less worn down usage units 12. The latter become further deteriorated, so that their state of deterioration approaches that of the less loaded usage units 12.

The wear value will change during operation, and this will occur more quickly if the usage unit 12 is operated at an operating point which departs from an ideal state (the usage unit is further worn down). Therefore, protective measures are also advisable.

Preferably for this, the usage units 12 are only operated in a tolerance range about an ideal charging state, which might be for example a charging state of 50%, and/or which may specify a current profile of an electrical current of the usage unit 12 that is flowing during the energy exchange.

In general, the ideal state is dependent on the technology used for the usage unit and is known in the prior art. The ideal state for battery modules can be defined by the following parameters:

SoC—State of Charge (energy content)—ideally 50%, for example;

DoD—Depth of Discharge—degree of discharge (current profile) e.g., ideal state of charge 50% minus maximum of 20% (tolerance range).

The indicated ideal values are dependent on the electrochemistry and/or the designated use and are to be determined each time by the skilled person for the specific energy supply device.

In general, the DoD should remain "low", i.e., not drop too much.

The further the current operating point is away from the ideal state, the quicker the wear value rises. The current operating point can be adjusted by adjusting the charging current/discharging current I for the usage units 12 accordingly. The AC/DC converter assembly 24 can be used to adjust the charging current, and the DC voltage converter 14 to adjust the discharging current. The wear states/wear values of all the usage units should be equalized in this way.

Another protective measure is the following: an overcapacity can be kept on hand at the usage units 12. Without additional switches, the load can be distributed by means of an overcapacity at usage units 12. There will be less loading per usage unit 12 if all usage units are always used at the same time in order to achieve uniform wear. But also the lifetime is increased because of the lower loading; for example, if only 100% (nominal rated value) is called up at 110% capacity per strand (sum of the individual capacities of the usage units 12 in the strand) with throttling by the control device 19, resulting in a lower peak loading per usage unit 12. The strand 11 for example delivers a larger voltage than is required, and therefore less current I needs to flow for the same power as when only 100% of the rated value (rated capacity) is occupied. For example: 12 usage units are provided, but a rated value of only 10 usage units is made available.

Without switches, 12 usage units need to be switched in, but the capacity for only 10 usage units is called up electronically (no switching needed!). In this way, weaker usage units are also possible, since their peak currents are lower, on account of the resulting higher strand voltage U, since more usage units are hooked up in series than are nominally present. The use of cheaper usage units is possible.

If switches are available, e.g., the semiconductor switches T, an exchanging can be provided among the usage units 12 of a strand 11, e.g., 10 usage units are always provided (producing the rated capacity) and 2 usage units are bridged over.

The providing of an overcapacity at usage units 12 means that the sum of the individual rated capacities of the usage units 12 (i.e., their combined gross capacity) is greater than the rated capacity made available to the outside. In this way, a fault in a usage unit can also be compensated. Thus, the energy supply device 10 can be provided, e.g., as an energy storage (such as a battery accumulator) with a designated or nominal rated capacity (such as 100 kWh). In actuality, a gross capacity is provided internally which is greater than the rated capacity made available on the outside (actual gross capacity of 110 kWh, for example, greater than the rated capacity of 100 kWh, for example). In other words, more usage units (e.g., battery cell modules) are present than are needed for providing the rated capacity.

Only as many usage units are made available to the outside for the discharging as correspond to the rated capacity. These usage units are then "active units". The other storage units (not actively used) are "reserve units".

According to a bad-block management (BBM), defective or depleted active units are recognized and taken out of operation. That is, upon malfunction/defect of an active unit (defective usage unit), this malfunctioning active unit can be taken out of operation and a reserve unit (a thus far inactive usage unit) can be placed in operation as a new active unit. Thus, the rated capacity is preserved despite the outage of one or more usage units. The term bad-block management (BBM) comes from flash memory technology (https://en.wikipedia.org/wiki/Flash_memory#Memory_wear).

In normal operation, however, a rotating or exchanging of the usage units may be done (e.g., by the round-robin algorithm or in general by a predetermined exchange protocol), so as to achieve uniform wear for all the usage units. If a reserve unit is then activated as a replacement for a malfunctioning active unit, the reserve unit will already have similar electrical properties to the other active units, because it already has a similar degree of wear (in the sense of the mentioned similarity criterion). This may reduce the extent of the necessary load balancing in the described manner.

Thanks to the dividing up of usage units into active units and reserve units, usage units may also be replaced during a maintenance during the operation of the energy storage, without affecting the rated capacity. The usage units being replaced can be separated as reserve units or taken out of operation and then be removed or replaced (dynamic changing of the usage units).

The bad-block management and/or the exchanging can also be done by groups or by strands, i.e., a group of usage units 12 or the entire series circuit 13 of a strand will then be hooked up and/or replaced. A bad-block management can also be done within a usage unit 12. Thus, for example, in the case of a usage unit 12 designed as a battery module, multiple battery cells can be provided, e.g., 12 battery cells as a 3-fold series circuit of 4 battery cells each in a parallel assembly. Then each time a parallel assembly can be switched out, e.g., by bridging.

The following can be provided in regard to a charge management for the strands.

Energy can be transferred across the busbars 18 by means of the DC voltage converter 14. Thus, a strand 11 can be charged via multiple sources, e.g., 40 kW from another strand 11 and 10 kW from a grid AC/DC converter 24', in order to provide 50 kW of charging power.

When supplying power, a load profile can be smoothed out or equalized in that several strands 11 will supply the consumer, while other strands 11 are already charging and will stand ready for the further charging process. For example, charging with 10 A and discharging with 20 A can be done at the same time (at least one strand 11 charges the appliance 100, at least one other strand 11 is charged from the supply grid 22). A boost current (transient peak, e.g., by more than a factor of 1.5) can also be generated by switching in a strand 11.

The (thermal/electrical) loading of the individual strands 11 can be limited by different strands 11 alternately supplying a connected appliance 100 (e.g., charging an electric vehicle). Thus, the mentioned DoD (Depth of Discharge) can also be limited, e.g., to 20%.

A complete galvanic separation between the strands can also be achieved by means of the mechanical switching units 15 at each strand 11, if they are switched to different busbars. This is the precondition for charging multiple appliances 100 (such as e-vehicles) at the same time. Each e-vehicle is connected to a different busbar 18' which is galvanically separated from the other busbars.

On the whole, the examples show how a servicing and/or an exchanging of usage units is made possible during operation in an energy supply device.

The invention claimed is:

1. An electrical energy supply device having a plurality of usage units divided amongst a plurality of strands, each usage unit configured to generate or to buffer electrical energy,
wherein each of the plurality of strands comprises multiple usage units connected in series to generated a summed voltage,
wherein each of the plurality of usage units is provided with an individual switching device for at least one of bridging, isolating, and discharging the corresponding usage unit,
wherein each of the plurality of strands is provided with, at both ends, a strand switching unit which provides a galvanically severable connection to a busbar assembly of the energy supply device,
wherein the energy supply device is provided with a control device which is configured to identify a defective usage unit in an affected one of the plurality of strands during operation of the energy supply device and, in response, separate the affected strand from the busbar assembly by means of the strand switching units of the affected strand and clear the summed voltage of the affected strand by separating all of the usage units provided on the affected strand from one another via the individual switching devices such that only an individual voltage of each of the usage units provided on the affected strand remains,
wherein the energy supply device further comprises an AC/DC converter assembly connected to the busbar assembly, the AC/DC converter assembly configured to exchange electrical energy with a supply grid comprising at least one of a public electrical grid and an alternating current source,
wherein the AC/DC converter assembly comprises multiple AC/DC converters, each of which is coupled by a dedicated decoupling switch to an input terminal for the supply grid on a first side and to the busbar assembly on a second side,
wherein the control device is configured to detect, during the operation of the energy supply device, a defective AC/DC converter and to decouple the defective AC/DC converter galvanically by operating the corresponding decoupling switch, and
wherein the defective AC/DC converter is configured to be galvanically decoupled and replaced during the operation of the energy supply device without having to disconnect a remainder of the energy supply device.

2. The energy supply device according to claim 1, wherein each of the plurality of usage units comprises at least one of a battery cell module, a fuel cell, a solar panel, a capacitor, and an electrical generator.

3. The energy supply device according to claim 1, wherein each of the strand switching units comprise at least one of an on/off type contactor and a 1-to-N multiplexer type contactor.

4. The energy supply device according to claim 1, wherein the control device is configured to exchange the defective usage unit of the affected strand for a new usage unit and to connect the new usage unit to the affected strand.

5. The energy supply device according to claim 1, wherein each of the plurality of usage units is provided with a diagnostic unit which detects a current state value of a predetermined electrical parameter of the corresponding usage unit, and
wherein the control device is configured to receive via a communication device of the energy supply device the current state values of all the usage units and to identify the defective usage unit based on the current state values.

6. The energy supply device according to claim 1, wherein the busbar assembly comprises a plurality of busbar pairs, and
wherein the strand switching units are configured to switch between the plurality of busbar pairs based on a switching signal of the control device.

7. The energy supply device according to claim 1, wherein each of the plurality of strands further comprises a DC voltage converter.

8. A method for operating an energy supply device having a plurality of usage units divided amongst a plurality of strands, each usage unit configured to generate or to buffer electrical energy, comprising:
detecting a defective usage unit in an affected strand via a control device of the energy supply device during operation of the energy supply device,
separating the affected strand from a busbar assembly of the energy supply device by means of strand switching units arranged at both ends of the affected strand, and
clearing a summed voltage of the affected strand by separating all of the usage units provided on the affected strand from one another via individual switching devices such that only an individual voltage of each of the usage units provided on the affected strand remains,
wherein each of the plurality of strands comprises multiple usage units connected in series to generate the summed voltage,
wherein each of the plurality of usage units is provided with the individual switching device for at least one of bridging, isolating, and discharging the corresponding usage unit, and
wherein the strand switching units provide a galvanically severable connection to the busbar assembly,
wherein the energy supply device further comprises an AC/DC converter assembly connected to the busbar assembly, the AC/DC converter assembly configured to exchange electrical energy with a supply grid comprising at least one of a public electrical grid and an alternating current source,
wherein the AC/DC converter assembly comprises multiple AC/DC converters, each of which is coupled by a dedicated decoupling switch to an input terminal for the supply grid on a first side and to the busbar assembly on a second side,
wherein the control device is configured to detect, during the operation of the energy supply device, a defective AC/DC converter and to decouple the defective AC/DC converter galvanically by operating the corresponding decoupling switch, and
wherein the defective AC/DC converter is configured to be galvanically decoupled and replaced during the operation of the energy supply device without having to disconnect a remainder of the energy supply device.

9. The energy supply device according to claim 2, wherein each of the strand switching units comprise at least one of an on/off type contactor and a 1-to-N multiplexer type contactor.

10. The energy supply device according to claim 2, wherein the control device is configured to exchange the defective usage unit of the affected strand for a new usage unit and to connect the new usage unit to the affected strand.

11. The energy supply device according to claim 3, wherein the control device is configured to exchange the defective usage unit of the affected strand for a new usage unit and to connect the new usage unit to the affected strand.

12. The energy supply device according to claim 2, wherein each of the plurality of usage units is provided with a diagnostic unit which detects a current state value of a predetermined electrical parameter of the corresponding usage unit, and
wherein the control device is configured to receive via a communication device of the energy supply device the current state values of all the usage units and to identify the defective usage unit based on the current state values.

13. The energy supply device according to claim 3, wherein each of the plurality of usage units is provided with a diagnostic unit which detects a current state value of a predetermined electrical parameter of the corresponding usage unit, and
wherein the control device is configured to receive via a communication device of the energy supply device the current state values of all the usage units and to identify the defective usage unit based on the current state values.

14. The energy supply device according to claim 4, wherein each of the plurality of usage units is provided with a diagnostic unit which detects a current state value of a predetermined electrical parameter of the corresponding usage unit, and
wherein the control device is configured to receive via a communication device of the energy supply device the current state values of all the usage units and to identify the defective usage unit based on the current state values.

15. The energy supply device according to claim 2, wherein the busbar assembly comprises a plurality of busbar pairs, and
wherein the strand switching units are configured to switch between the plurality of busbar pairs based on a switching signal of the control device.

* * * * *